Nov. 24, 1925.

G. CHRISTENSON

SWAB PACKING FOR DEEP WELLS

Filed Jan. 24, 1925

1,563,163

Inventor:
George Christenson
by Roberts, Roberts Cushman
Attys.

Patented Nov. 24, 1925.

1,563,163

UNITED STATES PATENT OFFICE.

GEORGE CHRISTENSON, OF NORTH PLAINFIELD, NEW JERSEY, ASSIGNOR TO JOHNS-MANVILLE, INCORPORATED, OF NEW YORK, N. Y., A CORPORATION OF NEW YORK.

SWAB PACKING FOR DEEP WELLS.

Application filed January 24, 1925. Serial No. 4,628.

*To all whom it may concern:*

Be it known that I, GEORGE CHRISTENSON, a citizen of the United States of America, and resident of North Plainfield, in the county of Somerset and State of New Jersey, have invented new and useful Improvements in Swab Packings for Deep Wells, of which the following is a specification.

This invention relates to heavy plungers, lifting bailers or swabs so-called and is particularly concerned with devices adapted to create a fluid-tight connection under relatively great pressures between a stem or hoisting rod and an irregular and broken interior cylinder surface, such as the tubular casing of a deep well.

Heretofore under some conditions it has been customary practice to elevate liquids from oil wells and deep artesian wells where the flow is not spontaneous by the so-called swabbing or bailing method in which the well casing is employed as the cylinder of a lift pump, the plunger ordinarily comprising a weight attached to a hoisting cable. This stem is usually tubular and is provided with one or more packings adapted to bridge the space between the stem and the interior surface of the casing. A check valve is usually employed to close the stem against the flow in one direction so that the liquids are permitted to pass the descending swab which is withdrawn by hoisting the cable thus bringing with it the superimposed column of liquid. The pressure to which these packings are often subjected in swabbing practice are very great and this together with the mechanically imperfect interior of the well casing has resulted in rapid destruction of and unreliable and inefficient operation of packing devices heretofore relied upon thereby causing a considerable waste of time and an enormous expense.

Objects of this invention are to provide a lifting plunger for pumping or swabbing adapted efficiently to form a fluid-tight connection with the interior surface of a cylinder or well casing; to provide a packing capable of withstanding very great pressures and adapted to form a fluid tight connection with a relatively imperfect cylindrical surface; to provide improved reinforcing means for protecting the packing against collapse by pressure and against broken and irregular surfaces in rough and uneven pipes thereby preventing mutilation and injury to the packing; and in general to provide a plunger packing having features of construction permitting efficient operation in the environment indicated.

One preferred form of the invention is illustrated on the accompanying drawings. in which.

Figure 1:
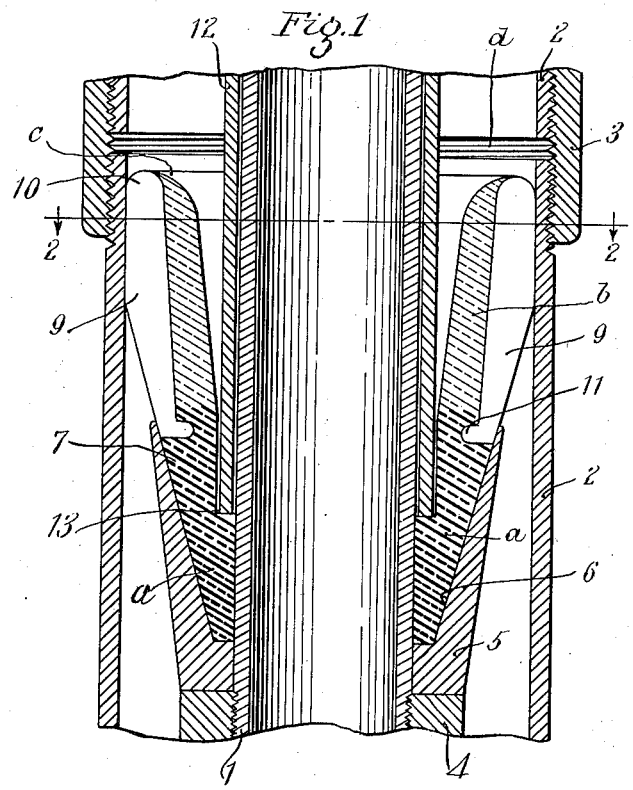
Fig. 1 is a vertical sectional elevation of a swab in a well casing.
Figure 2:
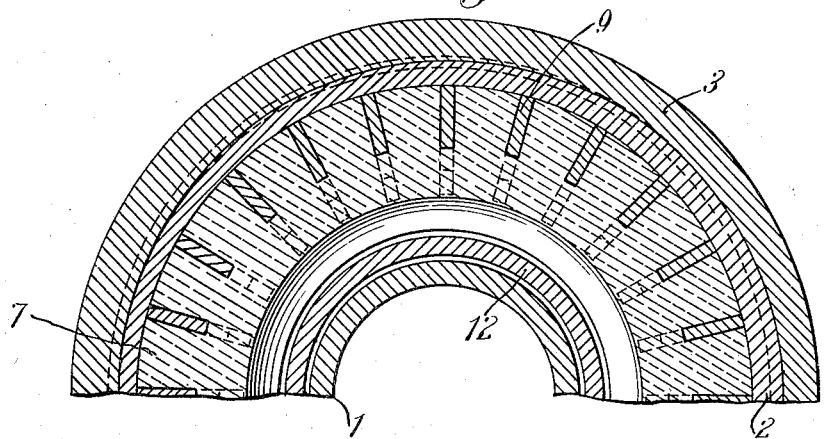
Fig. 2 is an enlarged transverse section on the line 2—2 of Fig. 1.

The embodiment of the invention shown for the purpose of illustration comprises a swab having a tubular stem 1 shown within a cylindrical well casing 2, having abutting pipe sections held together by collars 3. A portion of the stem 1 may be exteriorly screw threaded to receive a ring 4 on which rests a calyx 5 having an inwardly tapered recess 6 to support the packing cup 7 of which only one of the series recommended to be used is shown in Fig. 1.

The packing cups may be flaring frusto-conical bodies having an annular section or heel $a$ which rests in the tapered recess 6. Preferably the cups are made of a rubber compound of a type exhibiting when vulcanized great durability and resistance to fatigue from deformation of shape and of a structure hereinafter described in aid of natural qualities of the vulcanizing rubber compound to enable the completed cup to resist the relatively great longitudinal and radial pressures and rough treatment to which it is ordinarily subjected.

One preferred form of packing comprises a solid of revolution integrally moulded comprising portions of different grades or qualities of the moulded rubber compound (or rubber substitute) one of which kinds of compound when subjected to vulcanizing under the same temperature and pressure as the others will become relatively stiff and rigid whereas the other kind of compound under the same treatment will become a relatively flexible and relatively yielding resilient body. For example the cup 7 may comprise a heel portion made as an annulus $a$ as illustrated by the more heavily shaded lines and a lip portion $b$ in integral continuity with the heel portion. The annulus $a$ may comprise approximately one-half of the cup and is preferably made of a rubber compound heavily charged with sulphur and if desired with other vulcanizing agents or facilitators and so adapted when finished by subjecting it in a mould to a vulcanizing heat and pressure to present a very great elastic resistance to deformation of shape by crushing or shearing but nevertheless to be reasonably extensible when subjected to very great pressures. Preferably the calyx 5 surrounds and supports the heel portion $a$, and the lip portion $b$ extends outwardly and upwardly from the calyx 5. Rubber compounds of the above type are well known in the art.

The lip portion $b$ of the cup 7 is preferably made of a softer, less heavily sulphuretted material and therefore when vulcanized provides a more easily extensible and more flexible compound than the heel $a$. Preferably the packing is of the form shown on the drawings and comprises in general a flaring or conical annular solid tapering away to an edge $c$. Under some conditions it may be desired to vary the proportion of the packing cup especially the relative dimension of the relatively rigid heel portion $a$.

A preferred construction comprises a reinforcement serving as a guide and protector for the exterior surface of the cup 7 and adapted to prevent the lip $c$ or other portions of the packing from catching in projections and from entering deeply any hollow spaces such as the spaces $d$ at the abutting ends of the wall casing pipe sections as shown in Fig. 1. The reinforcements may of course vary; as shown, this comprises a spaced series of laterally placed metallic plates 9 having rounded ends 10 and anchored end portion (for example providing hooks 11) and firmly embedded in the substance of the cup, preferably in the harder or more heavily vulcanized region therein. Preferably the reinforced cups 7 are moulded at one operation in a mould already containing in proper spaced relation a sufficient number of plates 9 of suitable material such as tempered tool steel. As shown, the plates 9 are so embedded within the substance of the cup 6 to cause the exterior surface of the plates to coincide with the exterior of the body portion of the cup and preferably the lower end of the plates 9 is anchored in the rigid portion 8 of the cup adjacent the upper end of the calyx 5. Thus the plates extend approximately one-half of the length of the cup outside of the calyx so as effectively to reinforce the portion of the cup external of the tapered recess 6.

Under the pressures of use there is no leakage of liquid between the material of the cup 7 and the plates 9. The ring 4 and calyx 5 are screwed up to the desired position on the stem 1 in order to force the packing cup 7 against the spacing sleeve 12, an annular shoulder 13 being provided in the heel $a$ against which the sleeve 12 is adapted to bear. As so mounted, the plates 9 severally can yield outwardly with the lip portion $b$ of the cup under very great pressure developed within the cup and so permit a satisfactory fluid tight contact between the upper portion of the cup and the interior surface of the well casing 2. Any obstruction encountering the exterior surface of the packing when under pressure will however displace the cup and one or more of the plates 9 and thus result in a local depression only of the margin of the cup which is the desired effect. The plates 9 not only serve as skids, runners, or guides for the cup 7 but also to guard the cup from intermediate expansion into the grosser irregularity within the well casing without preventing fluid tight contact with normal surfaces.

It will be observed that the lower end of the reinforcement plates described lie within the calyx 5 so that the lip portion $b$ is capable of expanding against the interior surface of the cylinder 2 without restriction of the reinforcement. The heel $a$ however is prevented from expanding by the calyx. The bending stress which takes place in the region in which the lower end of the plates lie is reinforced by the relatively rigid heel as well as the plates. The packing is therefore guided over depressions or projections in the casing wall without mutilation or injury thereto.

I claim:

1. Packing comprising an expansible solid of revolution and longitudinally extending radially placed flat metal reinforcements having one end secured to the solid medially thereof and an edge coincident with a corresponding surface of the solid.

2. In a swabbing device for use in deep wells, the combination of a stem and an expansible packing, means for supporting one end portion of the packing on said stem adapted to enclose and restrain a substantial part of said end portion from expanding and flat reinforcements lying in radial planes in the body of said packing with outer edges at the exterior surface thereof having ends secured in said packing within said supporting means.

3. Packing comprising an expansible rubber compound cup having substantially equal regions differing in relative rigidity, one region forming a lip portion and the other region a heel portion, and flat metal reinforcements having one end moulded into said heel portion adjacent said lip portion and extending approximately one-half the length of the cup.

4. Packing comprising an expansible rubber compound cup having substantially equal regions differing in relative rigidity, one region forming a flexible lip portion and the other region forming a rigid heel portion in integral continuity with said lip portion, and flat metal reinforcement plates moulded into said cup in radial planes having one end moulded into said rigid heel portion adjacent said lip portion and one edge coincident with a corresponding surface of the cup.

5. A cup for forming a fluid tight connection between a stem and the interior surface of cylindrical casing of imperfect construction comprising a frusto-conical cup adapted to be expanded outwardly by relatively great pressures developed within said casing having regions differing in relative rigidity forming a relatively flexible lip portion adapted to be expanded against said casing and a relatively rigid heel portion adapted to be restrained from expanding, in combination with reinforcements of greater radial than circumferential dimensions lying in said lip portion and secured to said heel portion.

6. In a swabbing device for use in deep wells, the combination of a stem and an expansible rubber compound packing, a calyx on said stem having an annular recess for supporting said packing and restraining a substantial portion thereof from expanding, and flat metal reinforcement plates moulded into the median portion of the cup extending substantially longitudinally from said recess and lying radially therein to prevent undue local repression of the packing.

7. A liquid driving plunger comprising a stem, a calyx surrounding said stem having a recess, means for supporting the calyx, a frusto-conical rubber compound cup having substantially equal regions differing in relative rigidity, one region forming a relatively rigid heel lying in said recess and restrained from expanding by said calyx, the other region forming a relatively flexible lip adapted to expand under great internal pressures, means for holding the cup against said calyx and a series of reinforcement plates moulded into said cup having one end lying within said calyx and extending longitudinally and radially of said cup.

Signed by me at Manville, N. J. this 19th day of January 1925.

GEORGE CHRISTENSON.